(12) United States Patent
Prasnikar et al.

(10) Patent No.: US 6,309,523 B1
(45) Date of Patent: Oct. 30, 2001

(54) ELECTRODE AND ELECTROLYTIC CELL CONTAINING SAME

(75) Inventors: Albert R. Prasnikar, Madison; Richard C. Carlson, Euclid; Richard J. Coin, Chardon; Lynne M. Ernes, Willoughby; Catherine M. Lezan, Wickliffe, all of OH (US)

(73) Assignee: Eltech Systems Corporation, Chardon, OH (US)

( * ) Notice: Subject to any disclaimer, the term of this patent is extended or adjusted under 35 U.S.C. 154(b) by 0 days.

(21) Appl. No.: 09/428,455

(22) Filed: Oct. 28, 1999

Related U.S. Application Data

(62) Division of application No. 09/053,154, filed on Apr. 1, 1998, now Pat. No. 5,989,396.
(60) Provisional application No. 60/041,948, filed on Apr. 2, 1997.

(51) Int. Cl.$^7$ .................................................... C25B 9/00
(52) U.S. Cl. .................. 204/278.5; 204/269; 204/275.1; 204/286.1; 204/297.01
(58) Field of Search .................................. 204/232, 242, 204/269, 275.1, 278.5, 279, 286.1, 297.01, 268; 205/500, 501

(56) References Cited

U.S. PATENT DOCUMENTS

| | | | | |
|---|---|---|---|---|
| 4,248,690 | * | 2/1981 | Conkling | 204/268 |
| 4,568,440 | * | 2/1986 | Sutter et al. | 204/269 |
| 5,254,226 | * | 10/1993 | Williams et al. | 204/278.5 |

* cited by examiner

*Primary Examiner*—Bruce F. Bell
(74) *Attorney, Agent, or Firm*—Hudak & Shunk Co., L.P.A.; Michele M. Tyrpak

(57) ABSTRACT

An electrode is disclosed having a coating on part of the electrode, e.g., a front face, comprising the oxides of tin, antimony, at least one platinum group metal and at least one valve metal. Another part of the electrode, such as a back face, has a coating comprising the oxides of at least one valve metal and at least one platinum group metal. The electrode can be generally plate-shaped and most desirably has at least one chamfered corner. The electrode is particularly useful in a cell wherein brine electrolyte is electrolyzed to prepare a disinfectant solution containing hypochlorite. The disinfectant solution can be especially serviceable, such as in maritime application, for treating water, e.g., freshwater as represented by desalinated water.

4 Claims, 4 Drawing Sheets

ELECTRODE AND ELECTROLYTIC CELL CONTAINING SAME

CROSS-REFERENCE TO RELATED APPLICATION

This application is a divisional of application Ser. No. 09/053,154 filed Apr. 1, 1998 now U.S. Pat. No. 5,989,396 which claims the benefit of U.S. Provisional Application No. 60/041,948, filed Apr. 2, 1997.

STATEMENT REGARDING FEDERALLY SPONSORED RESEARCH

This invention was made with U.S. Government support under Contract No. N00167-88-C-0025. The Government has certain rights in this invention.

FIELD OF THE INVENTION

An electrode and electrolytic cell containing same finds particular utility for producing hypochlorite solution to disinfect a supply of freshwater such as produced by desalinators on board ships.

BACKGROUND OF THE INVENTION

Currently, such as in shipboard use, bromine cartridges are used for water disinfection. The bromine cartridge system is expensive to operate, has low reliability and maintainability. It has been found to be impractical to disinfect water over a wide range of conditions, and produces a hazardous waste product.

Another system used for shipboard water disinfection is batch chlorination with calcium hypochlorite. The batch chlorination method presents numerous safety hazards since the calcium hypochlorite is corrosive, has a limited shelf life, and can cause injury to personnel or damage to equipment if handled incorrectly. It also presents the potential hazard of causing fires and explosions if it comes in contact with any organic, combustible materials.

It would, therefore, be desirable to have a system that includes an electrolytic cell which can generate hypochlorite solution. The cell can assist in providing improved effectiveness of disinfection at reduced cost.

SUMMARY OF THE INVENTION

There is now provided an electrode and an electrolytic cell, which cell can be desirably utilized to provide improved effectiveness of disinfection. It can be employed in a system for treating water, which system can provide a safe and effective method of disinfection for a water supply at an economical cost.

In one aspect, the invention is directed to an electrode comprising a metal member having an anodic coating on a surface area of the member, which coating comprises the oxides of tin, antimony, at least one platinum group metal, and at least one valve metal, and having a cathodic coating on a surface area of the member that is not the surface area of the anodic coating, which cathodic coating comprises the oxides of at least one valve metal and at least one platinum group metal.

In a related aspect, the invention is directed to the method of preparing an electrode comprising an anodic coating, a cathodic coating and a substrate metal, with each coating containing metal oxides and being electrochemically active, which coatings coat the metal and are cured thereon, which method comprises:

(a) applying, to the metal for the anodic coating, but without curing applied coating, a composition comprising precursor substituents for oxides of tin, antimony, at least one platinum group metal and at least one valve metal;

(b) applying, to the metal for the cathodic coating, but without curing applied coating, a composition comprising precursor substituents for oxides of at least one valve metal and at least one platinum group metal; and (c) simultaneously curing the applied anodic coating precursor substituents and the applied cathodic coating precursor substituents on the substrate metal.

Also, the invention pertains to a generally plate-shaped electrode having front and back major faces and an edge, which electrode has an at least substantially rectangular shaped front major face and back major face and which edge has at least one chamfered corner.

A still further aspect of the invention is an improvement in an electrolytic cell comprising a housing for containing a plurality of electrodes maintained in parallel manner to one another and spaced apart from each other, which electrodes are secured within the interior of the housing, wherein liquid electrolyte distributed to the cell passes through the housing and through the spacings between the electrodes, the improvement comprising:

a cell cover member for the housing, the cell cover member having:

an inner surface facing the interior of the housing;

a plurality of slotted apertures through the entire thickness of the cover member, permitting the passage of liquid electrolyte therethrough; and a series of parallel rib members affixed to the inner surface of the cover member and extending outwardly therefrom, the rib members having spacings therebetween that connect in a liquid flow path to the slotted apertures.

DESCRIPTION OF THE PREFERRED EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention herein described while still achieving the favorable results of this invention.

Accordingly, the description which follows is to be understood as being a broad, teaching disclosure directed to persons of skill in the appropriate arts, and not as limiting upon the present invention. The description deals most particularly with electrolytic cell technology and discusses a disinfectant system embodying same.

It is to be understood that words such as "vertical", "upright", "top" and the like are generally only used herein as terms of convenience, usually to provide a better understanding of the orientation of parts, one to another. Such words should not be construed as limiting the invention unless expressly stated herein as such.

It is contemplated that the electrodes utilized in the electrolytic cell will generally be made from metal sheet material. The sheet will have front and back faces and usually at least two sets of opposed parallel edges. Typically, a sheet with rectangular faces will be used, providing one set of short edges, and one set of long edges for the sheet. The sheet is preferably a non-perforate, solid and inflexible sheet made from any of the metals generally used in making electrodes. By being inflexible, it may be bowed, but would not be readily coilable. Although preferably non-perforate, i.e., solid, it may be a punched plate, but would most likely not be a metal mesh. It is advantageous to use a valve metal, particularly such a metal as titanium, tantalum, zirconium, or niobium, or their alloys or intermetallic mixtures. It is preferred that titanium sheet be used. The electrode sheet material used for the electrodes can be readily shaped so as to form electrode sheets that are parallel to one another in the cell. The electrodes will be connected to a current distributor means for the electrodes. This can be at one or more edges of the electrodes or at one or more faces, e.g., a boss connection welded on a face. For the representative parallel electrode arrangement described herein, only the outermost electrodes need be connected.

Figure 1:
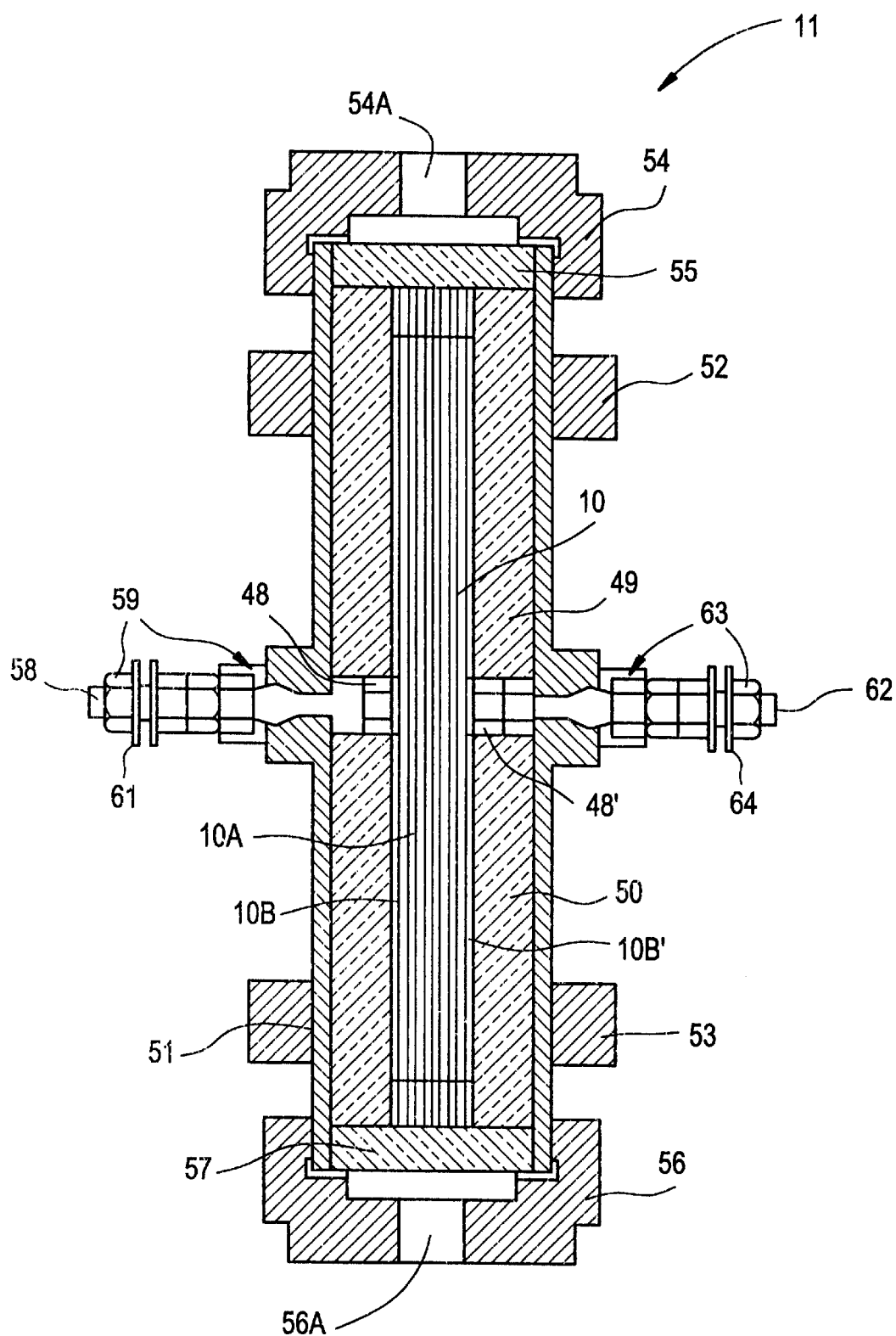
FIG. 1 is a front elevational view, in cross-section, of an electrolytic cell of the present invention.
Figure 5:
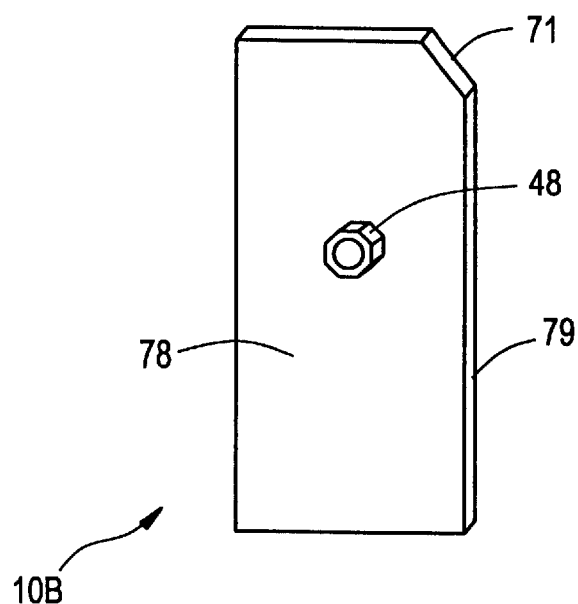
FIG. 5 is a front elevational view of a terminal full plate electrode, e.g., a cathode, useful in the cell of FIG. 1.
Figure 6:
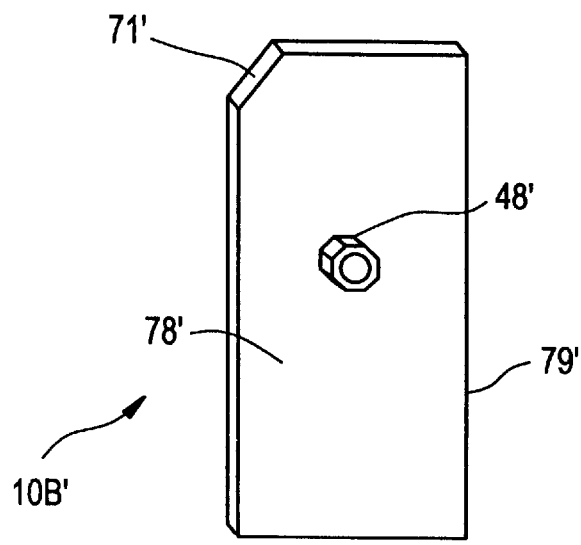
FIG. 6 is a front elevational view of another terminal plate electrode, e.g., an anode, useful in the cell of FIG. 1.

Referring then to the drawings, FIG. 1 depicts a representative cell 11 utilized for the present invention. The cell 11 contains nine electrodes 10, including seven center electrodes 10A and a pair of outer, or terminal, electrodes 10B, 10B'. The electrodes 10 are elongated, rectangular plate electrodes each having a front major face, a back major face and an edge 79 (FIG. 5). At the center of each of the outer electrodes 10B, 10B', front major face 78, 78' (FIGS. 5 and 6), there is a bus connector receiving member, or electrical connector nut, 48, 48'. The center electrodes 10A are similarly configured but have no electrical connector nut 48, 48'. Additionally, each electrode 10 has a bias cut corner, e.g., the bias cut corner 71 (FIG. 5), or the bias cut corner 71' (FIG. 6). All of the electrodes 10 are housed within an upper cell assembly inner compartment member 49 as well as a lower cell assembly inner compartment member 50. These members 49, 50 may contain slots, not shown. Edges 79 (FIG. 5) of the electrodes 10, usually just the edges 79 at the elongated sides of the electrodes 10, can be inserted in these slots for holding the electrodes 10 in place inside a central aperture of the inner compartment members 49, 50. The central aperture is rectangular in cross-section to conform with the shape of the perimeter of a parallel array of the electrodes 10 at a short edge.

These inner compartment members 49, 50 are housed inside a cell tube 51, which is typically circular in cross-section. Thus, the compartment members 49, 50 are also circular in cross-section at their circumference. The cell tube 51 is generally elongated and positioned in an at least substantially upright position. The cell tube 51 has an upper tube reinforcement band 52 and a lower tube reinforcement band 53. At the top of the cell tube 51 is a cell top end cap 54, having a central aperture 54A, and within this end cap 54, atop the upper cell assembly inner compartment member 49 is a cell cover member 60 (FIG. 2) comprising a top plate, or puck, 55. At the bottom of the cell 11, there is a cell bottom end cap 56, having a central aperture 56A. Inside this end cap 56 there is a cell cover member 70 (FIG. 4). comprising a bottom plate, or puck, 57.

At the side of the cell tube 51, about midway up the height of such tube 51, there is inserted into the tube 51 and between the upper and lower inner compartment members 49, 50 a cathode bus connector 58. This cathode bus connector 58 is inserted into the electrical connector nut 48 affixed on the outer major face 78 (FIG. 5) of a first outer cathode electrode 10B. This cathode bus connector 58 is held in place by various nuts 59 and washers 61. On the opposite side of the cell tube 51, and inserted through the cell tube 51 and between the upper and lower inner compartment members 49, 50, is an anode bus connector 62. This anode bus connector 62 connects with an electrical connector nut 48' affixed to a second outer anode electrode 10B' (FIG. 6). As with the cathode bus connector 58, the anode bus connector 62 is affixed in place by various nuts 63 and washers 64.

Figure 2:
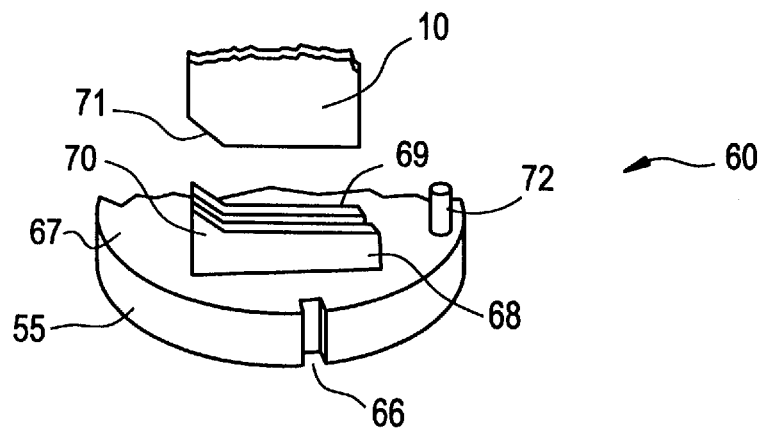
FIG. 2 is a partial perspective view of a cell cover member for the top of the cell of FIG. 1 and having, in exploded view, a portion of a representative. electrode adjacent to the cover member.

Referring then to FIG. 2, a cell cover member 60 has a top puck 55 containing a keyway 66 notched into the outer perimeter of the puck 55. The puck 55 is circular in shape to conform with the inner circumference of the cell tube 51. The keyway 66 matches with a key, not shown, that is present inside the top of the cell tube 51. The top puck 55 has an inner major face 67 which is at least substantially planar, e.g., a flat and smooth face 67. On this major face 67 are a series of parallel ribs 68. Each rib 68 is of the same size. There is one rib 68 for each electrode 10. That is, for the cell as disclosed in FIG. 1, there will be nine ribs 68. The ribs 68 are positioned parallel to one another, but spaced apart from each other. Also, each rib 68 has a top edge 69. Each rib 68 is long and narrow so that the top edge 69 conforms at least substantially in size with the size of a short edge of an electrode.

For each rib 68 at the top edge 69, at one end, there is an outwardly extending chamfer 70. For matching fit, each electrode 10 has a chamfered corner 71. When an electrode 10 is properly seated on the top edge 69 of a rib 68, the electrode chamfered corner 71 seats on the outwardly extending chamfer 70 of the rib 68. Also on the inner major face 67 of the top puck 55 is a single pin 72 extending outwardly from the face 67 in the manner of a rib 68. This pin 72, upon assembly of the cell 11, is inserted in a corresponding pin hole, not shown, indented within the upper cell assembly inner compartment member 49.

Figure 3:
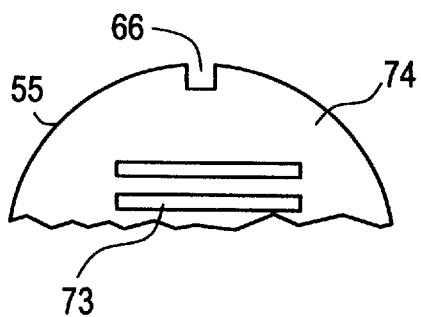
FIG. 3 is a front elevational view of the bottom face of the cover member of FIG. 2.

Then, referring to FIG. 3, the top puck 55 with the keyway 66 has, as seen from the outer major face 74 of the puck 55, a series of slots 73. Each slot 73 is of the same size and the slots 73 are parallel to each other, but spaced apart from one another. The slots 73 are thin and narrow, generally conforming in size to the top edge 69 of a rib 68. These slots 73 extend completely through the width dimension of the top puck 55 and open into the spacing between the rib 68. For the cell 11 having nine rib 68, there are eight slots 73. It is contemplated that the cell 11 will generally be made to contain one more rib 68, e.g., nine, than there are slots 73, e.g., eight. Electrolyte flowing through the slots 73 flows against the inner surfaces of the ribs 68 and against the major faces of the electrodes 10.

Figure 4:
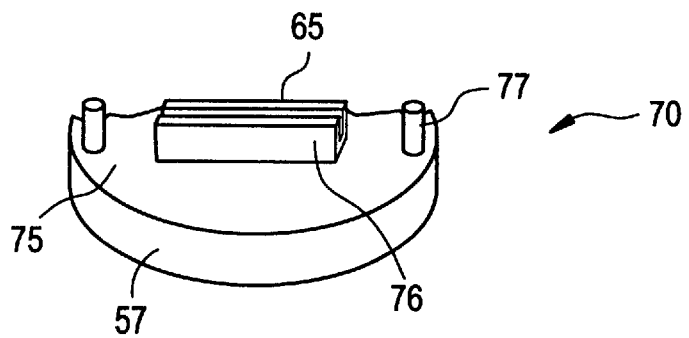
FIG. 4 is a partial perspective view of a cell cover member for the bottom of the electrolytic cell of FIG. 2.

Referring then to FIG. 4, a cell cover member 70 has a bottom puck 57 for the cell 11 and the cover member 70 has an inner major face 75. Seated on this inner major face 75, projecting in an outward manner, are ribs 76, each having an upper surface 65. As for the top puck 55, the ribs 76 on the bottom puck 57 are parallel to one another, but spaced apart from each other. Also, an electrode 10, at a short section of an electrode edge 79 (FIG. 5), will seat on the upper surface 65 of each rib 76. Thus, for the representative cell of FIG. 1, there will be nine ribs 76 in number. The bottom puck 57 likewise has slots (not shown) extending completely through the width of the bottom puck 57 in the same manner as for the slots 73 of the top puck 55 (FIG. 3). Hence, there will be eight slots in the bottom puck 57. On the inner major face 75 of the bottom puck 57, there are two outwardly extending pins 77 that seat within holes provided for such purpose within the lower cell assembly inner compartment member 50.

Referring then to FIG. 5, an outer electrode 10B, sometimes referred to herein for convenience as the "cathode electrode" 10B, has a major face 78, which in the figure as shown is its front face 78, and an edge 79. The edge comprises both an upper and a lower short section, that each correspond in length to the width of the electrode 10B, as well as including a long section at each side of the electrode 10B. For this generally rectangular outer electrode 10B, the edge 79 generally circumscribes the periphery of a rectangle, except for the electrode chamfered corner 71, i.e., it has two sets of opposed parallel edges. For the generally rectangular outer electrode 10B, the front face 78 is at least substantially planar, usually a flat and smooth front face 78, although other face configurations are contemplated. The electrode 10B is usually thin. All electrodes 10, including the outer electrode 10B depicted in the figure, may be referred to herein as "plate-shaped" or as a "sheet" electrode. Since the outer electrode 10B for the representative cell 11 of FIG. 1 will be in contact with a cathode bus connector 58 on its front face 78, the outer electrode 10B has an electrical connector nut 48. Owing to the cell construction as depicted in FIG. 1, the electrical connector nut 48 will be centrally located on the front face 78 of the outer electrode 10B. In addition to the front face 78, the outer electrode 10B will also have, at the reverse side as depicted in FIG. 5, a major back face (not seen). This back face will also be an at least substantially planar face.

Referring then to FIG. 6, an outer electrode 10B', sometimes referred to herein for convenience as the "anode electrode" 10B', is depicted. It is substantially the mirror image of the outer electrode 10B of FIG. 5. So, virtually all of what has been described hereinabove for the electrode 10B is applicable to the electrode 10B' and will not be repeated herein with regard to the electrode 10B'. Suffice it to say, it has a major face 78', which in the figure as shown is its front face 78', an edge 79' and a chamfered corner 71'. Since it is the outer electrode 10B' that for the representative cell 11 of FIG. 1 will be in contact with the anode bus connector 62 on its front face 78', it has an electrical connector nut 48'.

In assembly, and referring generally now to FIG. 1, electrodes 10, including all center electrodes 10A and the pair of outer electrodes 10B, 10B' can be inserted within, e.g., slid into, slots (not shown) of the upper cell assembly inner compartment member 49. The long sections of the electrode edge 79, 79' are inserted into these slots. In this assembly, the front face 78 of the cathode electrode 10B can be pressed against the inner wall of the cell assembly inner compartment members 49, 50. Because it is against the wall, this is an "inactive" face 78, as the word is used herein. Thus, the back face of this cathode electrode 10B may sometimes be referred to herein as the "active" face. Similarly, the back face of the anode electrode 10B' may also be termed its "active" face. In this assembly, care should be taken that the electrical connector nuts 48, 48' on the outer electrodes 10B, 10B' face outwardly to receive the bus connectors 58, 62. These electrical connector nuts 48, 48' can be previously secured to the outer electrodes 10B in electrical connection, such as by welding, soldering or brazing. All electrodes 10 can initially be made to extend beyond the length of the inner compartment member 49, in both upward and downward directions. The cell assembly top puck 55 can then be brought against an end of the electrodes 10, care being taken to match the outwardly extending chamfer 70 of the top puck ribs 68 with the electrode chamfered corners 71. The top puck 55 with the electrodes 10 in place, can then be pushed against the upper inner compartment member 49 in a manner so as to insert the pin 72 within an aperture (not shown) indented within the inner compartment member 49. This assembly can then be placed within the cell tube 51, care being taken that the keyway 66 of the top puck 55 matches with the key (not shown) contained in the cell tube 51.

The cell top end cap 54 can then be secured to the cell tube 51 in a manner aligning the end cap central aperture 54A with the slots 73 of the top puck 55. By this manner of assembly, the electrodes 10 are placed within the upper inner compartment member 49 so that an anode face of one electrode 10A is spaced apart and faces, in an opposing manner, a cathode face of an adjoining electrode 10A. Furthermore, the front faces 78, 78' of the outer electrodes 10B, 10B' are placed against the inner wall of the inner compartment members 49, 50. Moreover, by the combination of the keyway 66 and pin 72, the electrodes 10 are correctly inserted within the cell tube 51 in a manner insuring that the cathode bus connector 58 will connect with the appropriate electrical connector nut 48 on an front cathode face 78 of an outer electrode 10B. In the same manner, the anode bus connector 62 will connect with the electrical connector nut 48' on the front anode face 78' of the other outer electrode 10B.

The lower cell assembly inner compartment member 50 can then be slipped within the cell tube 51, insuring in the process that the electrodes 10 fit within any slots (not shown) contained on the inside surface of the inner compartment member 50. Thereafter, the cell assembly bottom puck 57 can be inserted into the cell tube 51 in a manner insuring that the two pins 77 are inserted within corresponding holes (not shown) contained within this lower inner compartment member 50. In this manner, each electrode 10 at its bottom edge, will seat against an upper surface 65 of the ribs 76 which themselves are seated on the inner major face 75 of the bottom puck 57. In a preferred embodiment, an elastomeric gasket, not shown, can be placed between the ribs 76 and the puck 57 on the face 75 of the puck 57. This can provide some resilience of the ribs 76 against the puck 57. In this manner, any slight variations in lengths for the electrodes 10 can be accommodated with all electrodes 10 retained in snug fit between both sets of the ribs 68, 76. After this part of the assembly has been completed, the cell bottom end cap 56 can be inserted over the bottom end of the cell tube 51 in a manner to align the end cap central aperture 56A with slots (not shown) in the bottom puck 57. To finish the assembly, cathode bus connector 58 and the anode bus connector 62 are inserted within the electrical connector nuts 48, 48'. The various nuts 59, 63 and washers 61, 64 are then secured, and connection can be made from these bus connectors 58, 62 to a power supply (not shown).

For the electrolytic cell 11, the cell tube 51 and end caps 54, 56 as well as the reinforcement bands 52, 53 can all be of a rigid polymeric material such as chlorinated polyvinyl chloride (CPVC) or the like, e.g., polyphenylene oxide, polyphenylene sulfide or polycarbonates. Within the electrolytic cell 11, where the electrodes 10 may, at least in part, be held in place by inserting edges of the electrodes 10 into slots of the inner compartment members 49, 50, a suitable material of construction for these members 49, 50 can be a material such as Kynar™, i.e., polyvinylidene fluoride, or the like. Such material is also serviceable for the pucks 55, 57 and their associated elements, e.g., the ribs 68, 76. Where nuts and washers have been shown, these may be of conventional metal materials for these elements, such as a valve metal, as represented by titanium. A valve metal such as titanium can also be a metal of choice for the bus connectors 58, 62 and the electrical connector nuts 48, 48'. Where such a metal is selected, it can be desirable to coat the metal before placing it in service. A suitable coating can be achieved by plating, e.g., platinum plating of titanium. Thus, there may be utilized items such as platinum plated titanium bus connectors 58, 62 and electrical connector nuts 48, 48'.

Although the electrodes 10 have been depicted in the figures as rectangular and in plate, or sheet, form, it will be understood that such shape and form are especially suitable where the electrodes 10 are to be used in the particular cell 11. However, other shapes and forms for the electrodes 10 may be useful, as where differing cell configurations are desired. Even for a cell such as the cell 11, electrodes 10 may be tapered, rather than rectangular, or square, and the shape of the cell 11 adjusted accordingly. Where electrodes 10 have rectangular or similar faces, e.g., square faces, or where they may be tapered so as not having long parallel edges, or the like, all such electrodes 10 are referred to herein for convenience as "substantially rectangular shaped", or as having faces of substantially rectangular shape. Other suitable forms may also, however, include cylindrical electrodes, such as having circular or oval cross-sections. Hence, other shapes and forms are contemplated for providing serviceable electrodes 10.

The electrodes 10 are coated with an electrically conductive, electrocatalytic coating. In general, coatings of this type have been described in U.S. Pat. Nos. 3,265,526, 3,632,498, 3,711,385 and 4,528,084. These coatings can contain at least one oxide selected from the group consisting of platinum group metal oxides, magnetite, ferrite, cobalt oxide spinel, and tin oxide, and/or contain a mixed crystal material of at least one oxide of a valve metal and at least one oxide of a platinum group metal, and/or contain one or more of manganese dioxide, lead dioxide, platinate substituent, nickel-nickel oxide or a mixture of nickel plus lanthanum oxides. More typically, such coatings for consideration herein can be those as described in U.S. Pat. Nos. 3,776,834, 3,875,043, or 3,878,083.

Advantageously, a coating is applied to one face of the electrode 10, which coating is referred to herein as the "anode" coating. The anode coating is one that, in general, is a mixed oxide coating of stannic oxide, antimony oxide, at least one platinum group metal oxide, and valve metal oxide. Such coatings may usually contain from about 30 to about 90 weight percent stannic oxide, about 1.0 to about 25 weight percent antimony oxide, about 1.0 to about 50 weight percent of at least one platinum group metal oxide, preferably iridium, and from about 0.5 to about 30 weight percent of a valve metal oxide, preferably titanium, with the proviso that the mole ratio of tin to antimony oxides is between about 99:1 and about 70:30. A mixed oxide coating of this type, but of more limited ratios, as well as of more limited amounts for at least one constituent, and thus being only representative of a suitable anode coating, has been disclosed in U.S. Pat. Nos. 3,875,043 and 3,917,518.

The other face of the electrode 10 then has applied thereto a coating that is referred to herein as the "cathode" coating. The cathode coating is advantageously one that contains a mixed oxide coating of at least one platinum group metal oxide. The platinum group metal oxide, as a single oxide, will generally be present in an amount within the range of from about 10 mole percent to about 45 mole percent, with a balance to 100 mole percent of valve metal oxide. Preferably, when ruthenium oxide is present, e.g., with another platinum group metal oxide, it will contribute at least about 5 mole percent of ruthenium oxide. Similarly, when iridium oxide is present in a platinum group metal oxide mix, it will generally contribute at least about 5 mole percent of iridium oxide. The balance of at least one valve metal oxide is preferably of titanium. The coating can be applied to the electrode 10 in any conventional manner. Reference in this regard can be made to the manner as disclosed in U.S. Pat. No. 3,875,043.

The resulting electrode 10 with the anode coating on one face and the cathode coating on the other face, will be referred to herein for convenience as the "bipolar" electrode. Preferably, the electrodes used in the cell 11 are bipolar electrodes 10 although it is contemplated that the invention is also applicable to electrodes that might be utilized as monopolar electrodes.

Initially, the coatings are prepared, typically as solutions from predominantly chloride or sulfate salts. Thus, the advantageous anode coating may be prepared as a solution such as disclosed in U.S. Pat. No. 3,917,518, with the solution containing the chloride salts of tin, antimony and ruthenium, along with orthobutyl titanate, with the solution being provided in a medium of butanol containing hydrochloric acid. However, other alcohol based solutions can be used, e.g., those based on ethanol or isopropyl alcohol. Also, water based solutions can be useful. For these, $TiCl_3$ or $TiCl_4$ may replace the titanate substituent. It can be serviceable to coat the substrate metal, e.g., titanium, such as by brush application of the coating solution onto a substrate surface, and then dry the solution followed by baking. Conventionally, this procedure is repeated to provide a more elevated coating weight than achieved by just a first coating. Where a current connection means for the electrode 10 includes an element secured to the electrode 10, e.g., an electrical connection nut 48 welded to the outer electrode 10B, such connection means can also be coated. However, generally, where a front face 78 of an outer electrode 10B will be against a wall, e.g., an inner wall of the inner compartment members 49, 50, such front face may not be coated. Hence, outer electrodes 10B, 10B' may only have one active face, i.e., the back face for these electrodes, although it is contemplated that both front and back faces could be coated.

It has been found that where the advantageous anode coating and the advantageous cathode coating are used, these coatings may be both applied to the same substrate material as anode and cathode coatings, without first drying, or drying and curing, the one coating before the application of the other coating. As an example, there may be employed a metal sheet wherein the faces of the sheet utilized for the bipolar electrode are both the front and back faces of the sheet. The anode coating may be applied on the front face of the sheet and, without more, the cathode coating applied to the back face of the sheet. Then, the two coatings can proceed concurrently through the same drying and baking conditions. Thus, these advantageous coatings have been found to be desirable for most efficiently providing fast, concomitant formation of both the anode coating and the cathode coating on the metal substrate.

In such simultaneous application procedure, both coatings for efficiency and economy are usually applied to the substrate metal in the same manner, e.g., by brushing or roller coating or the like, and then typically dried, such as at a temperature within the range from about 90° C. to about 120° C. for a time of about one to about ten minutes. The dried coatings can then proceed to baking, such as at a temperature on the order of from about 450° C. up to about 650° C. for a time from about five minutes to about thirty minutes. It is, however, contemplated that the drying step can be eliminated after each coating application and that the applied coatings can proceed directly to the baking step. For this concomitant application procedure, such could be useful for bipolar electrodes 10 not usually contemplated for use in the cell 11. These electrodes 10 would include perforate, as well as cylindrical-shaped or other shaped electrodes.

In addition to the application of these coatings on differing faces, e.g., front and back faces, of a substrate material, it is contemplated that they could be applied to different areas of a single face of a substrate. Such a type of bipolar electrode has been disclosed, for example, in U.S. Pat. No. 4,783,246. Therein, the anode coating can be present on a first zone of the one face, e.g., on the lower half of the front face 78 of the electrode 10, and the cathode coating on a second zone of the same face, in this case on the upper half of the front face 78 of the electrode. It will be understood that these electrodes may find use outside of hypochlorite generation. For example, it is contemplated that they may be employed in such applications as organic destruction or other similar electro-oxidation processes. For other disinfecting applications, the electrodes are contemplated for use in generating ions such as of cobalt, silver, iron and cerium.

It will be understood that the coatings may not be applied directly to the metallic surface of the substrate metal for the electrode 10, as the surface may proceed through various operations, including pretreatment before coating. For example, the surface may be subjected to an etching or hydriding or nitriding treatment. Prior to coating with an electrochemically active material, it has been proposed to provide an oxide layer. Thus, the coating may be applied to an intermediate layer, e.g., an oxide layer, on the substrate metal of the electrode 10. The oxide layer can be provided by heating the substrate in air or by anodic oxidation of the substrate as described in U.S. Pat. No. 3,234,110. European patent application No. 0,090,425 proposes to platinum electroplate the substrate to which then an oxide of ruthenium, palladium or iridium is chemideposited. Various proposals have also been made in which an outer layer of electrochemically active material is deposited on a sub-layer which primarily serves as a protective and conductive intermediate. U.K. Patent No. 1,344,540 discloses utilizing an electrodeposited layer of cobalt or lead oxide under a ruthenium-titanium oxide or similar active outer layer. Various intermediate oxide layers, including tin oxide based underlayers, are disclosed in U.S. Pat. Nos. 4,272,354, 3,882,002, 3,950, 240 and 5,672,394. The intermediate layer may be a thermally spray applied layer of a metal, or metal oxide, or both, with or without doping agent. The layer may be a suboxide layer and may be established by chemical vapor deposition. The layer can have a desirable surface roughness. These various considerations have been discussed in the U.S. Pat. Nos. 5,324,407 plus 5,672,394.

The cell 11 containing the bipolar electrodes 10 is particularly useful for generating hypochlorite in a system adapted for treating water, such as in providing potable water from a freshwater supply. The system might be put to use in maritime application, such as an offshore application. This would be an application such as on board a ship, or at an offshore drilling rig. However, it is to be understood that the system may find use outside of maritime application, such as in a land based installation. Although such a water source may be freshwater, i.e., desalinated, or other source of non-salty water, the water can still need to be disinfected, and may then be suitable to serve as a potable water supply. Such a system has been disclosed in U.S. Provisional Application No. 60/041,948.

Figure 7:
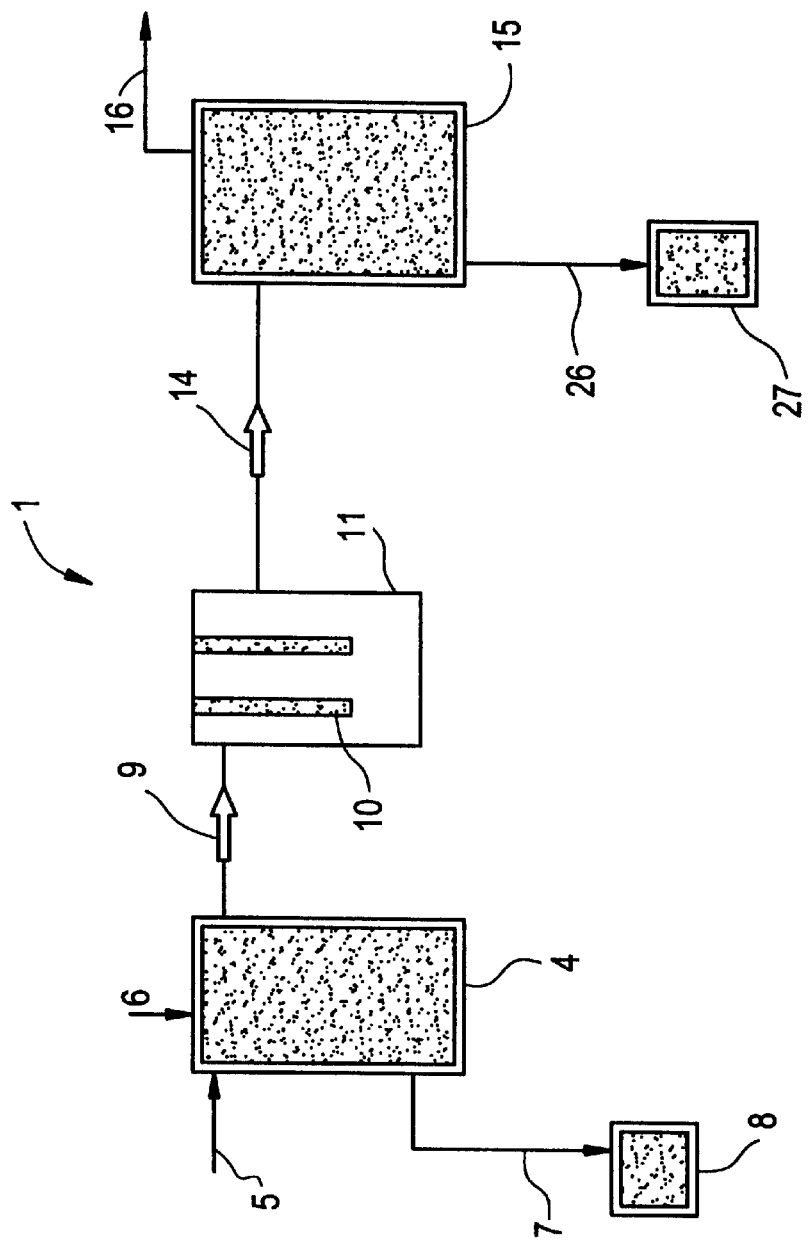
FIG. 7 is a schematic view of a disinfectant generating system incorporating the cell of FIG. 1.

To better provide an understanding of how a cell 11 might be utilized in a representative system, reference is now made to FIG. 7 As depicted therein, a disinfecting unit 1 receives water, feeding from a source not shown, that passes to a briner tank 4 through a tank water inlet line 5. Also, salt is supplied to the briner tank 4, entering through a salt inlet 6, for dissolution in the briner tank. The salt for addition to the briner tank 4 can be sodium chloride. However, it is to be understood that the cell is contemplated for use with other salts and these may include other chloride salts such as lithium chloride and potassium chloride. The salt may be in a purified form, or it may be in other form, e.g., iodized table salt. The tank 4 is usually an elongated, upright tank 4. Where sodium chloride is used, this salt will be so readily soluble in even unheated water, that agitation generally need not be used in the tank 4. Most typically, the tank 4 will be filled with a packed bed of the salt. The briner tank 4 is equipped with a disposal line 7 connecting to brine disposal means 8. Brine disposal from the briner tank 4 can be useful such as when the system is shut down.

Brine electrolyte is discharged from the briner tank 4 through an electrolyte line 9 feeding brine electrolyte to the electrolytic cell 11 containing the electrodes 10. The system of FIG. 7 is representative of batch operation, whereby product from the electrolytic cell 11 exits through a product discharge line 14 to a hypochlorite storage means, e.g., a tank 15. For a continuously operating system, a short length or coil of tubing could be used to store hypochlorite for continuous use without needing tank 15. The hypochlorite storage tank 15, which serves to store a supply of hypochlorite, has a hypochlorite feed line 16 for feeding hypochlorite to a source of freshwater (not shown) for disinfection. The hypochlorite tank 15 is also equipped with a hypochlorite tank disposal line 26 connecting to hypochlorite disposal means 27, e.g., a tank 27, which may be the same tank as for the brine disposal means 8. Equipping the hypochlorite storage tank 15 with such disposal apparatus can be useful in the same manner as for the disposal means 8 of the briner tank 4.

There will now be discussed a representative operation by referring to FIG. 7. Intake water flows through the tank water inlet line 5 to the briner tank 4. Also provided to the briner tank 4 is salt, usually in particulate form, e.g., granular, iodized table salt. Within the briner tank 4, salt and water mix, typically to prepare a concentrated brine solution. The brine solution then feeds through the electrolyte line 9 to the cell 11.

The cell 11 will be equipped with electrodes 10, i.e., the bipolar electrodes in plate form as described hereinabove, and electrical current will be provided to the electrodes 10 from a source not shown. The cell 11 may be the elongated, upright and unseparated cell 11 as shown in FIG. 1. For this representative operation, the cell 11 can be utilized to have a bottom inlet and top outlet so that electrolyte flows upwardly within the cell 11.

More particularly, and referring to the FIGS. 2, 3, 4 and 5, electrolyte flows into the central aperture 56A of the cell bottom end cap 56 and flows upwardly through slots, not shown, extending through the cell assembly bottom puck 57. The electrolyte continues flowing upwardly against the bottom puck ribs 76 in the spacing between the bottom puck ribs 76 and thus between the electrodes 10 and against each front major face 78 and back major face of the center electrodes 10A, as well as along the active back faces of the outer electrodes 10B, 10B', i.e., the faces of the outer electrodes 10B, 10B' which are not connected through the electrical connector nuts 48, 48'. Reaching the top of the cell 11, the electrolyte flows between and against the ribs 68 of the top puck 55 and upwardly through the slots 73 that extend through the top puck 55. Thereafter, the electrolyte flows through the central aperture 54A contained in the cell top end cap 54, and exits the cell 11.

In the representative cell 11, the seven vertically oriented bipolar electrodes 10, as well as the two outer electrodes 10B, 10B', are all in plate form and can measure, in inches, 1⅞×9⅜×0.60, for their width, height and thickness, respectively. The amount of edge removal for the chamfer 71 of each electrode 10 is generally in the proportion as shown in FIG. 5. These electrodes 10 will be closely spaced to one another, e.g., 0.04 inch apart; and positioned parallel to each other as well as parallel to the flow of electrolyte through the cell 11. In the electrolytic cell 11, in an electrolytic process that passes the electric current through the brine electrolyte, and where sodium chloride is the salt employed, the cell 11 generates a sodium hypochlorite solution in an aqueous medium, usually referred to herein simply as "hypochlorite" or "hypochlorite solution". In a typical operation, the representative cell 11 will generate an amount of hypochlorite equivalent to from 0.67 pound to 3 pounds of chlorine, as chlorine, per day. Product from the electrolytic cell 11, including hypochlorite solution and any gaseous products generated in the cell 11, e.g., oxygen and hydrogen, are then passed through the product discharge line 14 into the hypochlorite storage tank 15. For some installations, the gases may be simply vented to the atmosphere from the storage tank 15, or they may be otherwise disposed of. Hypochlorite can then be fed through the hypochlorite feed line 16 for use, e.g., to a source of water to be disinfected.

What is claimed is:

1. In an electrolytic cell comprising a housing for containing a plurality of electrodes maintained in parallel manner to one another and spaced apart from each other, which electrodes are secured within the interior of said housing, wherein liquid electrolyte distributed to said cell passes through said housing and through the spacings between said electrodes, the improvement comprising:

a cell cover member for said housing, said cell cover member having:

an inner surface facing the interior of said housing;

a plurality of slotted apertures through the entire thickness of said cover member, permitting the passage of liquid electrolyte therethrough; and a series of parallel rib members affixed to the inner surface of said cover member and extending outwardly therefrom, the rib members having spacings therebetween that connect in a liquid flow path to said slotted apertures.

2. The cell of claim 1 wherein said cell cover member contains a keyway notched within the perimeter of said member.

3. The cell of claim 2 wherein said cover member inner surface is provided by an at least substantially planar face of said member, said keyway is contained within an at least substantially circular perimeter of said member, said slotted apertures are thin and narrow and are parallel to one another, and said rib members are thin and narrow.

4. The cell of claim 1 wherein said cell cover member further contains a projecting pin, extending outwardly from said inner surface and spaced apart from said rib members and said slotted apertures.

\* \* \* \* \*